United States Patent [19]

Buchanan et al.

[11] Patent Number: 4,698,561
[45] Date of Patent: Oct. 6, 1987

[54] USE OF SCR'S IN EXTENDED RETARDING

[75] Inventors: Sabern D. Buchanan; Stephen L. Faulkner, both of Tulsa, Okla.

[73] Assignee: Unit Rig & Equipment Company, Tulsa, Okla.

[21] Appl. No.: 913,125

[22] Filed: Sep. 29, 1986

[51] Int. Cl.[4] .............................................. H02P 3/12
[52] U.S. Cl. ..................................... 318/87; 318/113; 318/345 G
[58] Field of Search ............... 318/86, 87, 139, 345 C, 318/345 G, 345 R, 373, 101, 102, 113

[56] References Cited

U.S. PATENT DOCUMENTS 3,815,001 6/1974 Jamieson .............................. 318/139
4,450,388 . 5/1984 Markham ............................... 318/87

Primary Examiner—William M. Shoop, Jr.
Assistant Examiner—Bentsu Ro
Attorney, Agent, or Firm—Head & Johnson

[57] ABSTRACT

An improved drive system for large mining trucks employing combined diesel/electric propulsion or the like wherein AC current generated by the alternator is rectified before powering wheel motors and wherein the wheel motors are used as generators to produce a retarding current that is directed to a resistive grid with plurality of shunting circuits thus extending the retard torque during dynamic braking and deceleration of the vehicle wherein the improvement comprises the use of silicon controlled rectifiers (SCR's) rather than contactors to achieve the desired electric circuit arrangement and in particular wherein four SCR's are used in the resistive grid to achieve a seven stage extension of the retarding torque and wherein the SCR's in the DC circuit are deactivated (opened) by back biasing with an SCR circuit that delivers AC current from the alternator to the cathode of a switching SCR in the retarding circuit.

18 Claims, 6 Drawing Figures

USE OF SCR'S IN EXTENDED RETARDING

BACKGROUND OF THE INVENTION

1. Field of the Invention

The present invention relates to an improved drive system for large mining trucks and similar equipment. More specifically, the invention relates to the use of silicon controlled rectifiers (SCR's) in a diesel/electric propulsion system with an extended retarding circuit.

2. Description of the Prior Art

It is generally known and accepted commercial practice to employ a combined diesel/electric propulsion system in large mining trucks and similar heavy equipment applications wherein the propulsion system is also used to retard (dynamically brake) the vehicle. Typically, a diesel engine is used to drive an alternator which converts the mechanical energy to electrical energy. A rectifier assembly then converts the alternating current (AC) electrical output of the alternator to direct current (DC) output which in turn powers motorized wheels typically consisting of a DC motor coupled through a gear train to the driven wheel of the vehicle. Electronic regulators are provided to control excitation of the alternator and motor fields to produce the desired horsepower level and electrical mechanical switch gears (contactors) are used in the prior art to make the desired electrical circuit arrangement. For the purpose of retarding vehicle motion, power resistors for absorbing the electrical energy created when the motors in the motorized fields are operated as generators are provided. In this manner, the kinetic energy of the moving vehicle is converted to electrical energy and then dissipated as heat, thus slowing the vehicle. This is generally referred to as the "retarding" mode of operation which is used to control the speed of the vehicle and to slow down the vehicle to a speed that allows the conventional hydraulic brake system to then stop the vehicle.

It is also generally known and an accepted commercial practice to extend the application of the retarding torque by employing a series of electromechanical contactors in parallel with the retarding resistors such as to electrically shunt sections of the retarding resistors and thus, reduce the overall resistance as the vehicle slows down. In other words, as the vehicle slows down, the generator (wheel motor) voltage decreases as does the retarding current at fixed resistance which in turn means that the retarding torque decreases. To compensate for the continuing decrease in retarding torque, portions of the fixed resistance are sequentially shunted, thus periodically increasing the retarding current and torque until the speed of the vehicle is sufficiently controlled at low vehicle speed. Thus, these extended retarding contactors are necessary to provide high levels of retarding effort (torque) at low speeds.

Prior to the present invention, the implementation of extended retarding using electromechanicl contactors was generally limited by such practical considerations as a balance between benefit dervied versus increased capital costs and increased maintenance costs. For, it is generally known that energizing and de-energizing at high currents is highly destructive and as such, the contactor tips of the prior art are high maintenance items requiring periodic replacement. In contrast, the use of a solid state device such as a silicon controlled rectifier (SCR) may in principle solve the prior art problem of replacement of the contactor tips, but it is also generally known and accepted that SCR's are not to be employed as a switch in a DC circuit such as used in electrical motor retarding. The historical objection to the use of SCR's in retarding is two-fold. A SCR in the normal state blocks voltage applied in either direction, conducts in a forward direction when a pulse is applied to the gate and continues to conduct as long as current flows from anode to cathode. In other words, in a continuous DC circuit, the SCR does not turn off (open) unless the anode voltage supply is removed, reduced below the brake over voltage or reversed. Thus, the use of SCR's in the retarding circuit to shunt a portion of the power absorbing resistors is complicated by the very nature of how they are to be turned off and if turned off during retarding, the way that they are turned off implies a delay or relaxation period conceptually inconsistent with the purpose and intent of retarding (i.e., a pause in the braking torque).

SUMMARY OF THE INVENTION

In view of the problems associated with the prior art use of contactors in retarding circuits of diesel/electric propulsion systems for heavy equipment vehicles such as mining trucks and the like and in view of the difficulty of shutting off (opening) a SCR in a DC circuit, including any inherent time lag or pause to accomplish the opening of a SCR, the present invention provides an improved drive system with extended retarding that employs SCR's in the rectifying of the AC source as well as in the DC shunting of retarding resistance.

Thus, the present invention provides in a drive system for a vehicle wherein an alternator driven by a power source produces AC current that is rectified to DC current before being used to power wheel motors and wherein the drive system provides for retarding of the motion of the vehicle by suspension of the DC current from the alternator that is driving the wheel motors and then allowing the wheel motors to generate a DC current that is directed through a series of resistors to dissipate the energy, the specific improvement comprising:

(a) a first SCR located between the output of the DC current generated by the wheel motors during retarding of the motion of the vehicle and the series of resistors through which the DC current is directed to dissipate the energy;

(b) at least one circuit containing a second SCR wherein the circuit when the second SCR is conductive shunts a portion of the series of resistors through which the DC current generated by the wheel motors is directed; and (c) at least one circuit containing a third SCR wherein the circuit when the third SCR is conductive delivers current from the alternator to the cathode of the first SCR such as to back bias the first SCR and allow it to be turned off.

It is an object of the present invention to provide an improved drive system for the diesel/electric propulsion of large mining trucks or similar DC electric motor powered vehicles. It is a further object to provide such a drive system which employs silicon controlled rectifiers in the retarding circuit. It is still a further object to provide such a SCR implemented retarding circuit that can achieve up to seven stages of extended retarding with as few SCR's as possible and/or minimum number of free wheeling pauses during retarding. Fulfillment of these objects and the presence and fulfillment of additional objects will become apparent upon complete reading of the specification and claims taken in conjunction with the attached drawings.

DESCRIPTION OF THE PREFERRED EMBODIMENTS

Figure 1:
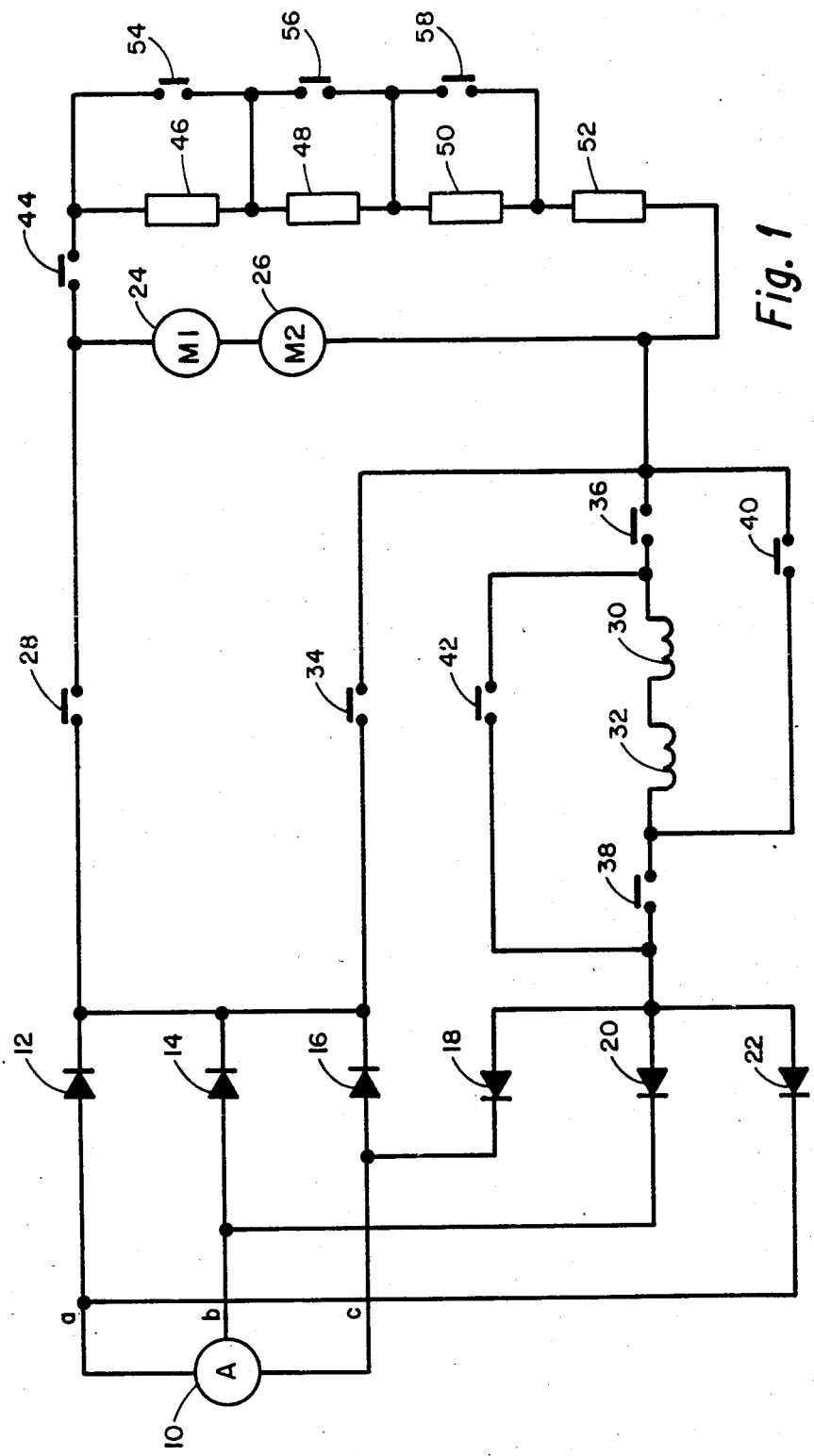
FIG. 1 is a schematic wiring diagram of a typical prior art retarding circuit using electromechanical contactors.

The improved drive system for large mining trucks and the like according to the present invention, how it operates, how it differs from the prior art systems and the advantages and benefits for using such a drive system can perhaps be best explained and understood by reference to the drawings. FIG. 1 illustrates a typical electrical schematic of the drive system of the prior art with three steps of extended retarding as previously mentioned. In this prior art circuit arrangement, various contactors are employed to switch from drive mode to retard mode, to switch from forward to reverse drive modes as well as to achieve extended retarding. As illustrated, an alternator 10 typically powered by a diesel engine (not shown) produces three-phase alternating current (phases a, b and c) which is fully rectified by a set of six diodes 12, 14, 16, 18, 20 and 22, thus representing the AC portion of the overall circuit. In this prior art illustration, the armatures of the pair of DC electric motors 24 and 26 are powered when contactor 28 is closed and the pair of DC electric motor fields 30 and 32 are powered in series with the armatures 24 and 26 and contactor 34 is open. The pair of contactors 36 and 38 and the pair of contactors 40 and 42 act in unison with each other, opening and closing simultaneously but in opposition to the other pair, thus creating essentially a double pole, double throw switching. That is to say, when contactors 36 and 38 are closed, contactors 40 and 42 are open, and vice versa. This in turn controls the direction of current flow through the motor field windings 30 and 32, thus establishing whether the motors are being driven forward or in reverse (i.e., backing up the vehicle). To achieve the extended retarding (in this case, three stage retarding), the armature windings 24 and 26 of the motors are connected through contactor 44 to a series of power absorbing resistors 46, 48, 50 and 52. The first three of this series can be selectively shunted from the power dissipating circuit by closing contactors 54, 56 and 58, respectively. Thus, in order to retard the forward motion and momentum of the vehicle, contactor 28 is opened and contactor 44 is closed, thus allowing the wheel motors to act as generators producing a DC voltage and retarding current that is initially directed back through contactor 44 and the series of power absorbing resistors 46, 48, 50 and 52.

Figure 5:
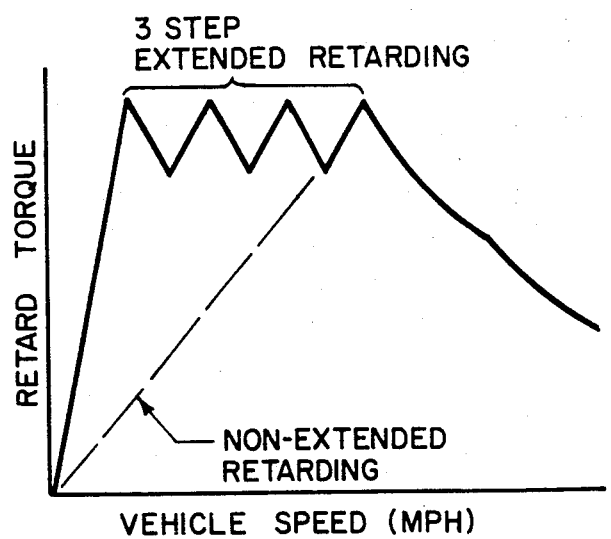
FIG. 5 is a plot of retard torque as a function of vehicle speed for a typical prior art retarding circuit of FIG. 1.

The right portion of FIG. 5 illustrates the retard torque associated with the onset of retarding applied at high speeds. As illustrated, the torque will initially rise, reaching a maximum and then sharply drop off as the speed diminishes, following the broken dashed line marked "non-extended retarding" if all resistance remains in the power absorbing circuit. In order to extend the retarding torque, the contactor 54 is closed, shunting resistor 46 shortly after the peak torque is achieved. With the lowering of the resistance, the retarding current increases and the retarding torque goes through a second maximum. Shortly after passing through the second maximum, the contactor 56 is closed, thus removing resistor 48 and again, creating another retarding current increase and third retarding torque peak. Similarly, the contactor 58 is closed shortly after this retard torque maximum, creating a further peak in the sawtoothed extended retarding torque curve. Because of this extension of maximum retarding torque towards the lower speed, the overall process of retarding the forward motion of the vehicle (the dynamic braking of the vehicle) is enhanced. Ideally, the greater the number of individual peaks or retarding steps that can be achieved, the greater the retarding torque during slow down and the faster the vehicle can be stopped. However, each additional step of retarding involves an additional contactor and one more closing of the contactor tips, which as previously indicated represents energizing/de-energizing at high currents which in turn dictate periodic replacement and additional servicing as well as risk of failure.

Figure 2:
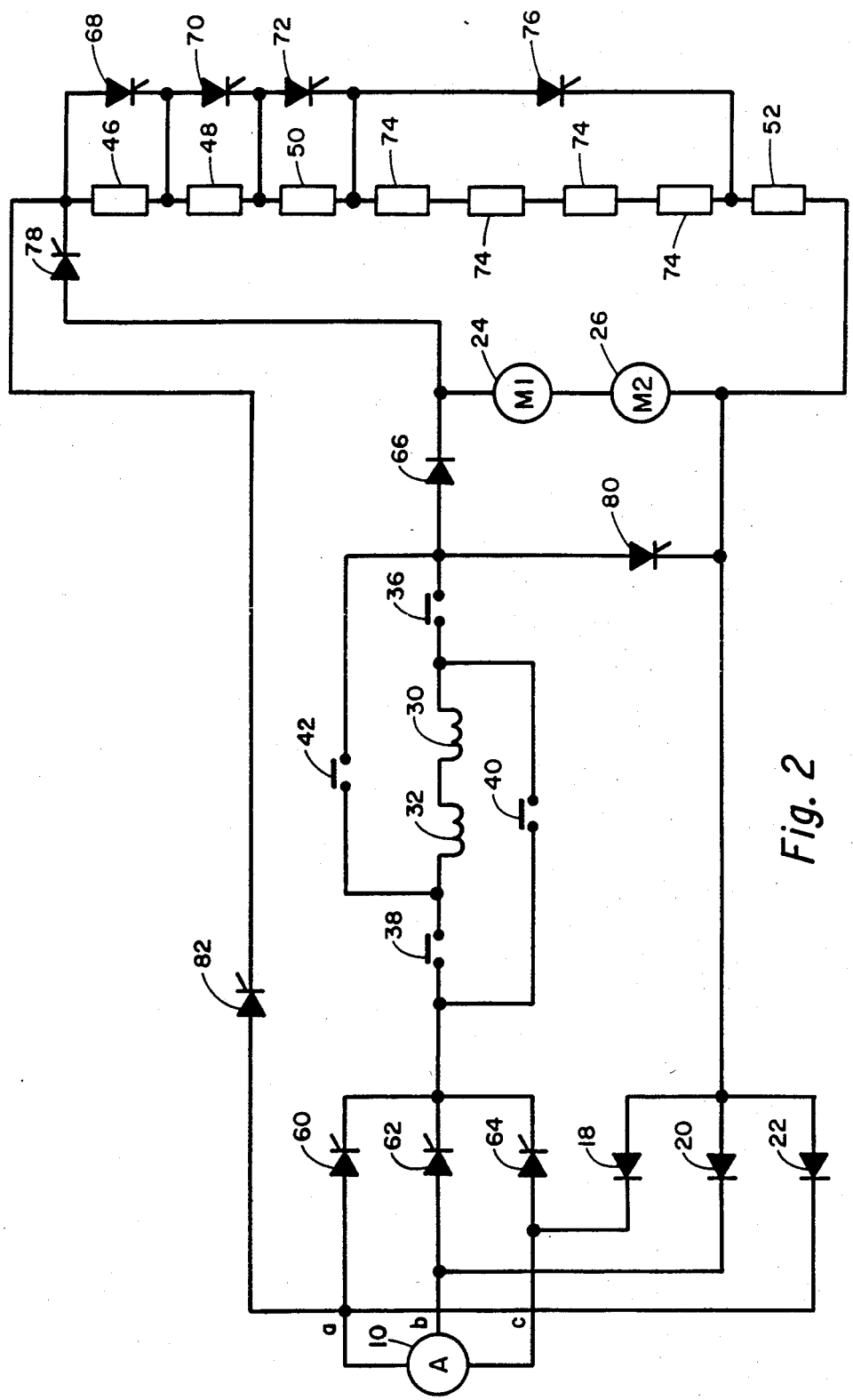
FIG. 2 is a schematic wiring diagram of a typical retarding circuit according to the present invention using silicon controlled rectifiers (SCR's).

FIG. 2 illustrates one preferred embodiment of the present invention wherein SCR's are employed, rather than contactors. In describing this particular embodiment of the present invention as well as the embodiments of FIGS. 3 and 4, numerals used to identify the individual components of the prior art circuitry of FIG. 1 which are still present in the circuitry according to the present invention are identified by use of the same number. Circuitry elements not present in the prior art circuitry are identified by numerals other than those used in describing FIG. 1, while elements common to the embodiments of FIGS. 2 through 4 bear the same numeral. Thus, as illustrated in FIG. 2, the drive system according to the present invention involves an alternator 10 which has its voltage output fully rectified, but in this case by a series of three SCR's 60, 62 and 64 on the positive current side and conventional diodes 18, 20 and 22 on the return negative side. It should be kept in mind as will be appreciated after more fully describing the present invention that the conventional diodes (i.e., 12, 14 and 16) could be used in place of the SCR's 60, 62 and 64 provided a contactor or the like be present in the DC output lead common to all three and as such, the present description and disclosure should not be viewed as unduly limiting.

During propulsion, the fully rectified output of alternator 10 passes through the armature windings 24 and 26 and the field windings 30 and 32 of the two motors similar to the prior art system of FIG. 1. During retarding, the SCR's 78 and 80 are closed (activated) allowing for controlled excitation of the wheel motor fields 30 and 32 by optimum excitation of the alternator (not shown), thus providing the desired retarding current that is directed through the resistive grid. The armature current path is blocked during retarding by the presence of an additional diode 66 rather than contactor 28 of FIG. 1. In a manner analogous to the prior art circuit, the direction of current flow through the motor fields 30 and 32 can be reversed by synchronously opening and closing of contactors 36, 38, 40 and 42, creating what is effectively a DPDT witch to reverse the direction of the vehicle movement. Also, the armature windings of the motors 24 and 26 are connected to a series of power absorbing resistors 46, 48, 50 and 52. However, in this particular embodiment, the total resistance is partiioned off into three lead resistors of approximately equal resistance, shunted by circuits involves SCR's 68, 70 and 72 followed by resistors 74 approximately four times the resistance of 46, 48 and 50 and shunted by a single SCR 76. Also, the retarding circuit of FIG. 2 has a SCR 78 occupying the position corresponding to contactor 44 of the prior art embodiment of FIG. 1. To complete the drive system of the present invention, the return side of the armature 24 and 26 are connected directly to the return diodes 18, 20 and 22, while the output side of the motor field windings 30 and 32 and current reversing DPDT switch 36 through 42 are tied through SCR 80 (during retarding only) to the return side diodes. Also, at least one of the alternator output phases (phase a in FIG. 2) is tied through SCR 82 to a series of power absorbing resistors (specifically, the lead resistor 46) between SCR 68 and 78, the novel purpose of which will be more fully explained later.

Figure 3:
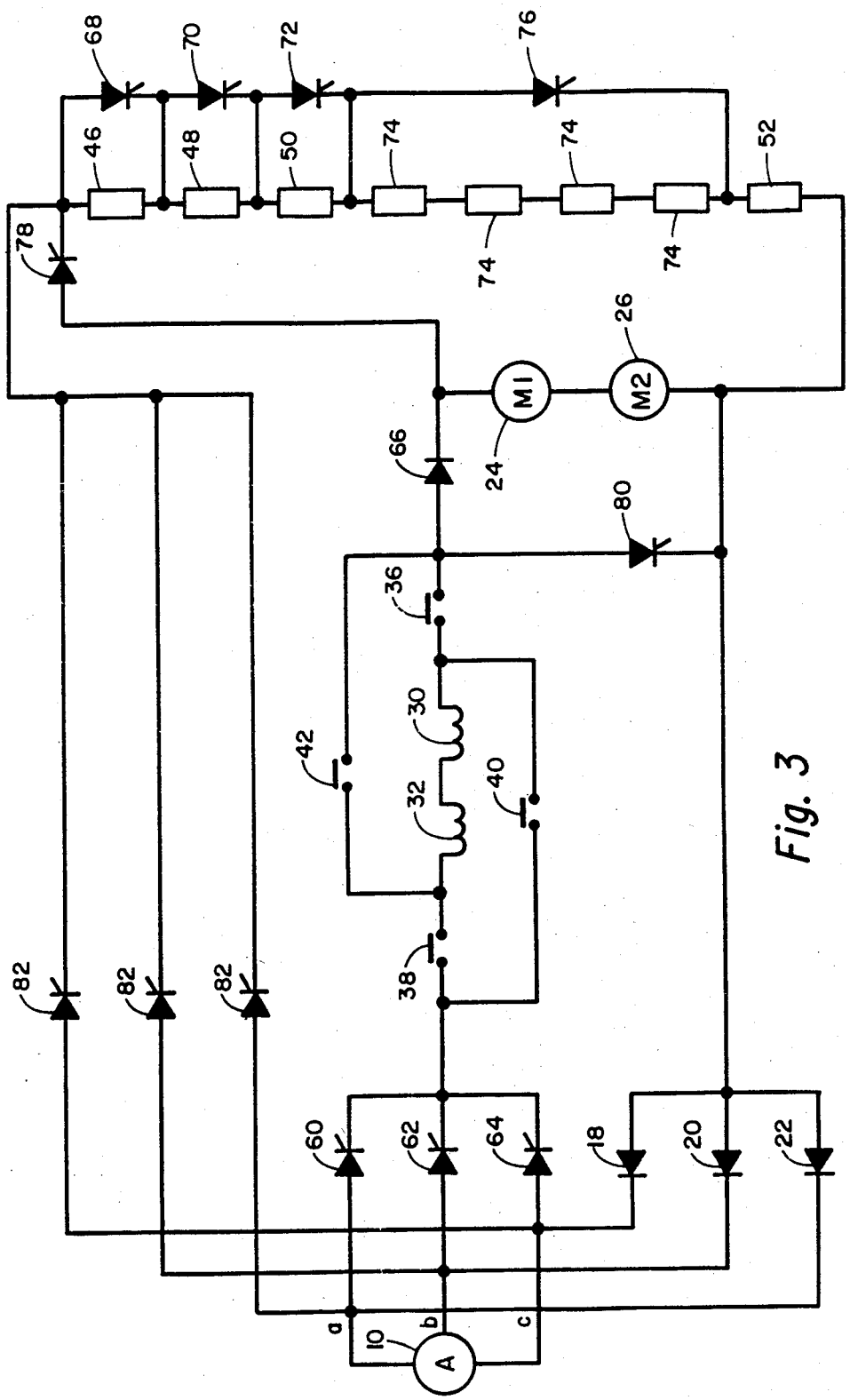
FIG. 3 is a schematic wiring diagram of an altered embodiment of the retarding circuit of FIG. 2 employing a set of three SCR's connected to separate output phases of a three-phase AC source.

In comparing the embodiment of FIG. 3 to that of FIG. 2, it should be apparent that the only difference is that each output phase of the alternator 10 (phases a, b and c) is tied through a SCR containing circuit to the input of the lead power absorbing resistor 46. Fo all practical purposes, the embodiment of FIG. 2 and specifically, the SCR 82 of phase a functions in a manner and for an intended purpose equivalent to each of the corresponding SCR containing circuits of the embodiment of FIG. 3. As such, the numeral 82 has been applied to each of the SCR's and the following discussion is to be considered applicable for all.

During operation of the drive system illustrated in FIGS. 2 and 3, the basic overall concept of the prior art circuitry of FIG. 1 (e.g., forward and reverse motions and extended retarding) are generally achieved. However, the way the objectives are achieved differs significantly, particularly relative to the turning off of the SCR's 68, 70, 72, 76 and 78 employed to shunt the resistors 46, 48, 50 and 74 in order to achieve the desired seven step extended retarding of the present invention. It should be kept in mind that during retarding, the motors act as generators and as such, the armature windings of 24 and 26 are theoretically producing a forward current through SCR 78, 68, 70, 72 and 76 which means that once they are turned on, they apparently cannot be turned off short of total cessation of rotation of the wheel motors (i.e., no motion of the vehicle). In contrast to this apparent limitation on the use of SCR's, the present invention provides a method of taking advantage of the alternator voltage rise in the AC portion of the circuit to reverse bias the voltage across the SCR's in the DC portion of the circuit (particularly during retarding) such as to allow the SCR's to turn off (open). Consequently, seven stage extended retarding can be achieved with only four SCR's being employed on the resistive grid and only one pause for turning off the SCR's during the stepwise extension of the retard torque.

Figure 6:
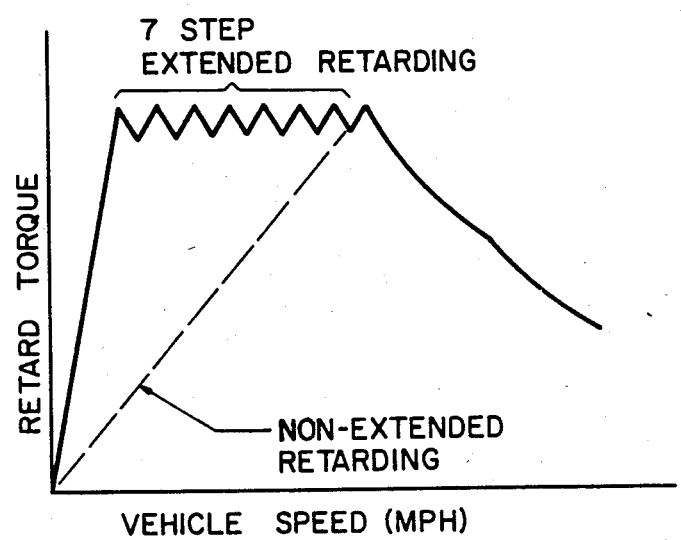
FIG. 6 is a plot of retard torque as a function of vehicle speed for the seven step extended retarding achieved in the retarding circuitry of FIGS. 2 through 4 according to the present invention.

To achieve this and as illustrated in FIGS. 2 and 3, the resistive grid is divided into incremental units of resistance corresponding to essentially three sequential resistors 46, 48 and 50 of equal value followed by a resistance four times greater 74 and finally, the remainder of the resistance grid 52. It should be appreciated that the specific values of the resistors do not have to be equal, particularly if the extending of the torque is to be non-uniform and as such, this description should not be unduly limiting. Initially, at high speed, the retarding current produced in the armature windings 24 and 26 when the wheel motors are operating as generators (i.e., SCR's 68, 70, 72 and 76 are open and SCR 78 is closed) is directed through the entire resistive grid. As such, the resulting retarding torque as a function of vehicle speed is plotted to the right side of FIG. 6. As the vehicle slows down, the retard torque reaches a maximum similar to FIG. 5 of the prior art system. The retard torque then begins to fall, characteristic of non-extended retarding and would continue to fall following the dashed line if the shunt circuits involving SCR's 68, 70, 72 and 76 were not activated. In a manner analogous to prior art system, SCR's 68, 70 and 72 are turned on (i.d., the gate to each respective SCR is pulsed), thus producing the first three steps or peaks to the left of the initial high speed peak. At this point in time, the SCR's 68, 70 and 72 are turned off and the SCR 76 is then turned on to create the next peak or maximum in the retard curve corresponding to the removal of four relative units of resistance from the resistive grid used to dissipate the retarding current. This resistance is then further decreased by three additional increments by again sequentially turning on SCR's 68, 70 and 72. Thus, the present invention provides a method of producing a seven stage or seven step extended retarding of electric wheel motors, while employing only four SCR's in the resistive grid shunt circuit. This is also accomplished with only one interruption of the continuous application of retard torque corresponding to the transition from removal (shunting) of three units of resistance to removing four units of resistance. Similarly, the present invention provides a method of producing a three step extended retarding while employing only two SCR's in the resistive grid shunt circuit, rather than three contactors of the prior art. To accomplish this, one interruption of the continuous application of retard (shunting) between one relative unit of resistance removal and two relative units of resistance removal is used followed by the sum of both (i.e., removal of three relative units of resistance).

Figure 4:
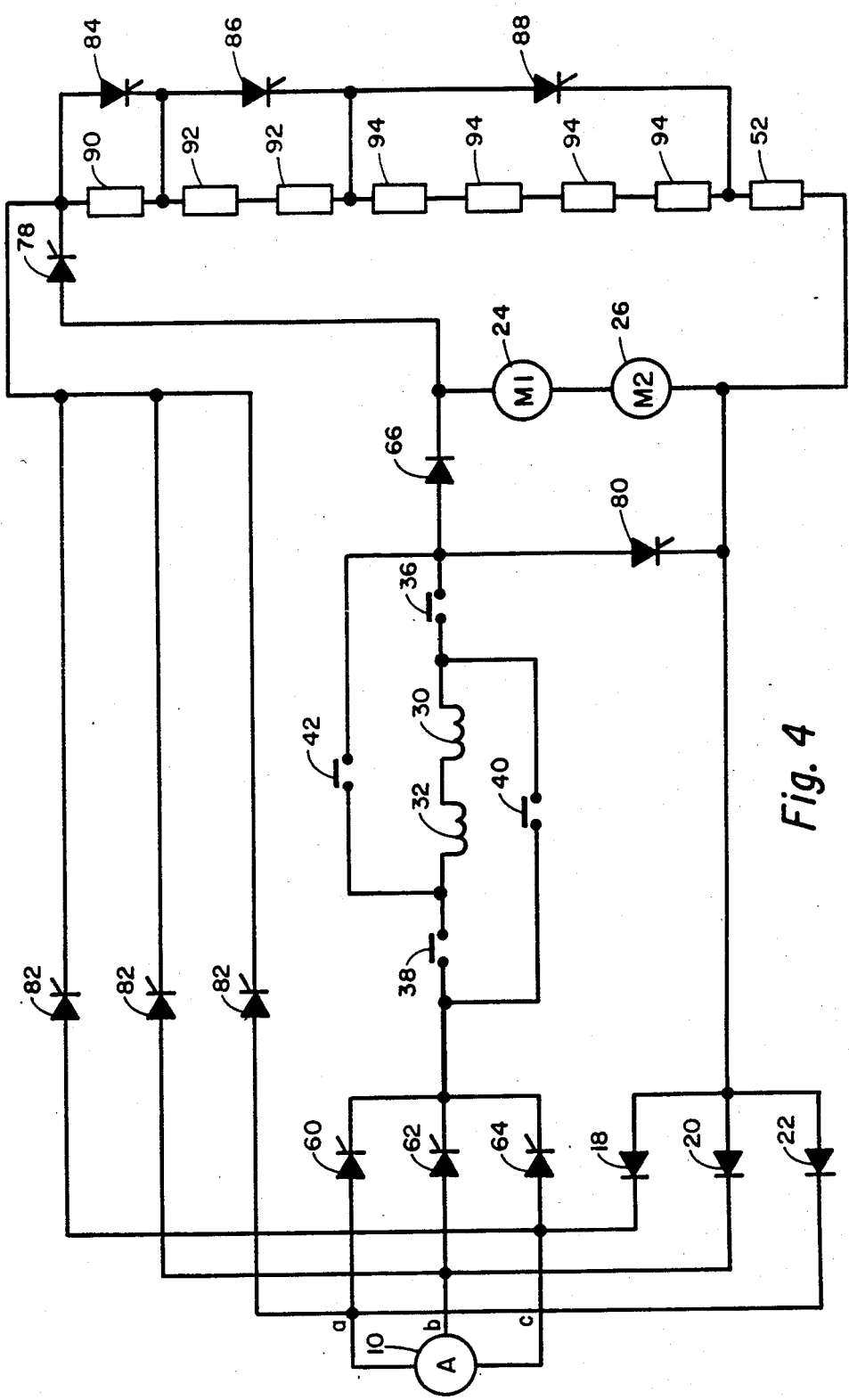
FIG. 4 is a schematic wiring diagram of an alternate embodiment of the drive system according to the present invention employing the power absorbing resistors and a set of three SCR shunting circuits.

FIG. 4 illustrates another specific embodiment of the present invention very similar to that described in FIG. 3, except the seven steps or stages of retarding is achieved using only three SCR's 84, 86 and 88 to partition the resistive grid. As seen in FIG. 4, the shunt circuit containing SCR 84 by-passes one unit of resistance 90. The shunt circuit containing SCR 86 removes two units of resistance 92 and the shunt circuit containing SCR 88 removes four units of resistance 94. To achieve the same seven steps of extended retarding illustrated in FIG. 6, the first removal of resistance is achieved by turning on SCR 84 consisting of one unit of resistance being removed. To remove the second unit of resistance, SCR 84 is first turned off and SCR 86 is then activated (turned on). The SCR 84 can then be turned on a second time to achieve the third step, after which both SCR's 84 and 86 are turned off and SCR 88 is turned on to remove (shunt) four units of resistance. SCR 84 can then be turned on to achieve five units of resistance being withdrawn from the power dissipating resistive grid. Again, SCR 84 is turned off and SCR 86 is turned on (actually, SCR 88 is simultaneously turned off and turned on as will be appreciated later) to increase the number of units of resistance withdrawn from the grid to six. Finally, the SCR 84 is turned on a fourth time to achieve a full seven stage extending retarding.

As previously indicated, the present invention provides a novel method of employing the voltage rise associated with the alternator to back bias the SCR's used in the resistive grid shunting circuit to deactivate and open the SCR's (turn them off). FIGS. 2 through 4 illustrate circuits that can accomplish this. Generally, the present invention provides at least one SCR containing circuit (SCR 82) from at least one output phase of the alternator to the input side of the power absorbing resistive grid such as to temporarily back bias the retarding current, thus commutating the current passing through the series of shunt SCR's for sufficient periods of time for them to turn off and lock off. This in turn allows the SCR's to be turned back on selectively as desired. This general procedure is performed whenever the extended retarding sequence requires a SCR to be turned off and is also used when retarding is terminated by the vehicle operator (i.e., the vehicle is stopped, no further braking required and/or vehicle acceleration is demanded).

As previously indicated, during normal operation of the vehicle, whether forward or reverse power, the field windings and motor armature windings are in series with the fully rectified DC current produced by the alternator 10. The SCR's 78, 80 and 82 are open circuits (turned off). Upon cessation of power and initiation of the application of retarding (dynamic braking), the SCR's 78 and 80 are activated (closed) directing the current from the field windings through SCR 80 back to the return portion of the rectifying circuit (i.e., diodes 18, 20 and 22) and simultaneously directing the retarding current produced in the motor armature windings through SCR 78 and power absorbing resistors (46, 48, 50, 74 and 52 for FIGS. 2 and 3 and 90, 92, 94 and 52 for FIG. 4) before returning to the return side of the motor armature. Initially upon application of retarding, the high rpms of the motor in conjunction with the excitation of the motor fields creates high voltage and maximum retarding current. But as the motor wheels are slowed (as the vheicle speed decreases), the voltage drops off and less retarding current and retarding torque is produced to further stop the vehicle. At this point, the sequence of SCR's in the shunting circuit of the resistive grid are turned on to remove the resistance and thus step the retard current back up to optimize the retard torque. As the sequence of resistors are removed according to the present invention, there will be specific transitions that will require turning off specific SCR's in the shunting circuits (e.g., transition between three and four units of resistance for FIGS. 2 and 3 and transitions between one and two; three and four; and five and six for FIG. 4).

In order to use the SCR 82 to turn off the SCR's in the shunting circuit (SCR's 68, 70, 72 and 76 of FIGS. 2 and 3 and SCR's 84, 86, and 88 of FIG. 4) while retarding is taking place, all excitation of the wheel motor fields 32 and 30 must be removed (i.e., no current flow through the field windings of the wheel motors). This is accomplished by turning all excitation off of the alternator 10 with SCR 80 on. This starts the current decay associated with residual magnetism in the alternator and motor field windings. Once the current decay reaches a safe level (typically, 400 to 500 amps), the SCR 60, 62 and 64 are turned off by removing the applied voltage on the gate. Since these SCR's are part of the AC portion of the circuitry, unlike the SCR's in the DC portion, they will turn off spontaneously upon removal of the gate voltage. With the SCR 60, 62 and 64 off, the SCR 82 can be switched on and SCR 80 can be switched off. The excitation of the alternator 10 can then be reinitiated. As the alternator output voltage begins to rise, the output current is directed through one or more phase circuits via SCR 82 to the cathode of SCR 78. At the point in time that the alternator voltage rise delivered via SCR 82 to the cathode of SCR 78 reaches and exceeds the retarding voltage produced by the wheel motors acting as a generator, SCR 78 becomes back biased (i.e., no forward current flow from anode to cathode of the SCR) and will be shut off. Preferably, the back bias voltage is maintained for a sufficient time to insure that the SCR is deactivated and locked in the open status (i.e., no risk of transient forward current). At this time, the SCR 82 is deactivated and spontaneously open, again because it is part of the AC circuit. In this manner, the present invention allows the SCR's of the shunting circuit to either be reassigned to a new status associated with the next step or stage of extended retarding (if needed) and return to full retarding (i.e., turning on of SCR 78 and SCR 80) or reassigned to a new status associated with cessation of retarding and resumption of forward or reverse power (i.e., SCR 78, 80 and 82 off). This second alternative can be accomplished by monitoring the speed of the vehicle in conjunction with the control settings from the operator and represents either total stopping of the vehicle or operator's decision to resume acceleration or the like. Preferably, before resuming any of the alternative, post-turning off of the SCR's in the DC portion of the power system, the excitation of the alternator 10 is again shut off and any residual power associated with the reverse biasing via SCR 82 is allowed to dissipate through the power absorbing resistive grid particularly when the status of SCR's 78, 80 and/or 82 are changed, thus protecting the wheel motors from any unnecessary residual current transients.

This concept of activating the AC alternator phase circuits containing the SCR's 82 can also be advantageously performed to assist in promoting the current decay associated with the residual magnetism of the alternators. Thus, according to the present invention, the SCR's 82 can be pulsed on and off after removing the alternator excitation such as to direct the residual current through the resistive grid. This occurs at such time as initiation of retarding, switching or reassigning the status of the SCR's in the DC circuit and the like. This in turn will tend to reduce the transition times associated with such events.

It should be appreciated that in implementing the present invention, a separate control system or control circuit for sequentially activating and deactivating the respective SCR's in response to the vehicle operator commands and status of the vehicle is to be provided, as generally known in the art. Thus, the present invention is viewed as being compatible with various types of control equipment including, but not limited to, the preferred microprocessor controlled signals or the like. It should be further appreciated the basic concepts and features of the present invention can be incorporated into various wheel motor driven configurations as generally known in the art, including by way of example, but not limited thereto, individual drive wheel systems, parallel or series drive wheel configurations and combinations thereof; and as such, this disclosure and description of the particular preferred embodiments should not be interpreted as being unduly limiting.

Having thus described the invention with a certain degree of particularily, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

We claim:

1. In a drive system for a vehicle wherein an alternator driven by a power source produces AC current that is rectified to DC current before being used to power wheel motors and wherein the drive system provides for retarding of the motion of the vehicle by suspension of the DC current from the alternator that is driving the wheel motors and then allowing the wheel motors to generate a DC current that is directed through a series of resistors to dissipate the energy, the specific improvement comprising:
   (a) a first SCR located between the output of the DC current generated by the wheel motors during retarding of the motion of the vehicle and the series of resistors through which the DC current is directed to dissipate the energy;
   (b) at least one circuit containing a second SCR wherein said circuit when said second SCR is conductive shunts a portion of the series of resistors through which the DC current generated by the wheel motors is directed; and
   (c) at least one circuit containing a third SCR wherein said circuit when said third SCR is conductive delivers current from said alternator to the cathode of said first SCR such as to back bias said first SCR and allow it to be turned off.

2. An improved drive system of claim 1 further comprising a plurality of additional circuits each containing a separate SCR wherein each of said plurality of circuits when said SCR of said circuit is conductive shunt an additional portion of the series of resistors through which the DC current generated by the wheel motors is directed.

3. An improved drive system of claim 2 wherein the total number of circuits containing SCR's that shunt portions of the series of resistors through which the DC current generated by the wheel motors is directed is four and the sequential relative resistance values being shunted by said circuits are proportional to the numerical sequence one, one, one, and four.

4. An improved drive system of claim 3 wherein said alternator is polyphase and each phase output of the alternator is connected through separate circuits containing SCR's to the cathode of said first SCR such as to back bias said first SCR and allow it to be turned off when said SCR's are conductive.

5. An improved drive system of claim 3 wherein the AC current is rectified by the use of three SCR's.

6. An improved drive system of claim 3 wherein the wheel motors comprise field circuits and armature circuits, and the field circuits are in series with the armature circuits with at least one diode therebetween such as to block the DC current generated by the wheel motors during retarding and wherein the output of the field circuits are further provided with a circuit containing a SCR that when conductive directs the current from the alternator passing through the field circuits back to the alternator return circuit.

7. An improved drive system of claim 2 wherein the total number of circuits containing SCR's that shunt portions of the series of resistors through which the DC current generated by the wheel motors is directed is three and the sequential relative resistance values being shunted by said circuits are proportional to the numerical sequence one, two and four.

8. An improved drive system of claim 7 wherein said alternator is polyphase and wherein each phase output of the alternator is connected through separate circuits containing SCR's to the cathode of said first SCR such as to back bias said first SCR and allow it to be turned off when said SCR's are conductive.

9. An improved drive system of claim 7 wherein the AC current is rectified by the use of three SCR's.

10. An improved drive system of claim 7 wherein the wheel motors comprise field circuits and armature circuits, and the field circuits are in series with the armature circuits with at least one diode therebetween such as to block the DC current generated by the wheel motors during retarding and wherein the output of the field circuits are further provided with a circuit containing a SCR that when conductive directs the current from the alternator passing through the field circuits back to the alternator return circuit.

11. An improved drive system of claim 2 wherein said alternator is polyphase and each phase output of the alternator is connected through separate circuits containing SCR's to the cathode of said first SCR such as to back bias said first SCR and allow it to be turned off when said SCR's are conductive.

12. An improved drive system of claim 2 wherein the AC current is rectified by the use of three SCR's.

13. An improved drive system of claim 2 wherein the wheel motors comprise field circuits and armature circuits, and the field circuits are in series with the armature circuits with at least one diode therebetwen such as to block the DC current generated by the wheel motors during retarding and wherein the output of the field circuits are further provided with a circuit containing a SCR that when conductive directs the current from the alternator passing through the field circuits back to the alternator return circuit.

14. An improved drive system of claim 2 wherein the total number of circuits containing SCR's that shunt portions of the series of resistors through which the DC current generated by the wheel motors is directed is two and the sequential relative resistance values being shunted by said circuits are proportional to the numerical sequence one and two.

15. An improved drive system of claim 1 wherein said alternator is polyphase and each phase output of the alternator is connected through separate circuits containing SCR's to the cathode of said first SCR such as to back bias said first SCR and allow it to be turned off when said SCR's are conductive.

16. An improved drive system of claim 1 wherein the AC current is rectified by the use of three SCR's.

17. An improved drive system of claim 1 wherein the wheel motors comprise field circuits and armature circuits, and the field circuits are in series with the armature circuits with at least one diode therebetween such as to block the DC current generated by the wheel motors during retarding and wherein the output of the field circuits are further provided with a circuit containing a SCR that when conductive directs the current from the alternator passing through the field circuits back to the alternator return circuit.

18. A method of operating a drive system of a vehicle wherein an alternator driven by a power source produces AC current that is rectified to DC current before being used to power wheel motors and wherein the drive system provides for retarding of the motion of the vehicle by suspending the DC current from the alternator powering the wheel motors and then allowing the wheel motors to generate a DC current which is directed through a resistive grid to dissipate the energy and thus apply retarding torque decelerating the vehicle in which at least one SCR is located between the output of the DC current generated by the wheel motors during retarding of the motion of the vehicle and the resistive grid through which the DC current is directed to dissipate the energy, and a plurality of shunting circuits is utilized each containing a separate SCR that when conductive shunts a portion of the resistive grid and in which at least one circuit contains a SCR that when conductive delivers AC current from the alternator to the cathode of the at least one SCR located between the output of the DC current generated by the wheel motors and the resistive grid, the method of operating the drive system comprising the steps of:

(a) activating the SCR in said one circuit that delivers AC current from the alternator to the cathode of the at least one SCR located between the output of the DC current generated by the wheel motors and the resistive grid;

(b) deactivating the at least one SCR located between the output of the DC current generated by the wheel motors and the resistive grid; and (c) deactivating the SCR in said one circuit that delivers AC current from the alternator to the cathode of the at least one SCR located between the output of the DC current generated by the wheel motors and the resistive grid, thus allowing further selective activation and deactivation of the SCR's of the plurality of shunting circuits.

* * * * *